United States Patent
Madan et al.

(10) Patent No.: US 8,737,276 B2
(45) Date of Patent: May 27, 2014

(54) METHOD AND APPARATUS USING MODIFIED SUBFRAMES

(75) Inventors: Ritesh K. Madan, Jersey City, NJ (US); Shailesh Patil, Bridegwater, NJ (US)

(73) Assignee: QUALCOMM Incorporated, San Diego, CA (US)

(*) Notice: Subject to any disclaimer, the term of this patent is extended or adjusted under 35 U.S.C. 154(b) by 113 days.

(21) Appl. No.: 13/534,731

(22) Filed: Jun. 27, 2012

(65) Prior Publication Data

US 2014/0003301 A1   Jan. 2, 2014

(51) Int. Cl.
*H04J 3/00* (2006.01)
*H04W 24/00* (2009.01)

(52) U.S. Cl.
USPC ............................................ 370/280; 370/329

(58) Field of Classification Search
USPC .................................. 370/280, 329, 241, 310
See application file for complete search history.

(56) References Cited

U.S. PATENT DOCUMENTS

| | | | |
|---|---|---|---|
| 8,611,295 B2 * | 12/2013 | Song et al. | 370/329 |
| 2011/0249642 A1 | 10/2011 | Song et al. | |
| 2011/0275382 A1 | 11/2011 | Hakola et al. | |
| 2011/0305179 A1 | 12/2011 | Wang et al. | |
| 2011/0310830 A1 | 12/2011 | Wu et al. | |
| 2013/0058234 A1 * | 3/2013 | Yang et al. | 370/252 |
| 2013/0084864 A1 * | 4/2013 | Agrawal et al. | 455/436 |
| 2013/0084865 A1 * | 4/2013 | Agrawal et al. | 455/436 |
| 2013/0294351 A1 * | 11/2013 | Kwon et al. | 370/328 |
| 2013/0303153 A1 * | 11/2013 | Bontu et al. | 455/423 |

FOREIGN PATENT DOCUMENTS

WO   WO2011122833 A2   10/2011

* cited by examiner

*Primary Examiner* — Brian D Nguyen
(74) *Attorney, Agent, or Firm* — James K. O'Hare

(57) ABSTRACT

The herein disclosed apparatus, systems, and methods use Almost Blank Subframes (ABS) to manage interference between D2D and WAN transmissions. In particular, an eNodeB is disclosed comprising a controller module operable to obtain an indicator of a need for a quiescent subframe, and to select responsively thereto a subframe of a communication frame, and allocate the selected subframe as an Almost Blank Subframe (ABS). The base station includes a transceiver module operable to communicate the ABS over an air interface, and to send a misinformation signal to another eNodeB device indicating the ABS is not almost blank.

36 Claims, 14 Drawing Sheets

| Uplink/downlink configuration | Downlink-to-uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

METHOD AND APPARATUS USING MODIFIED SUBFRAMES

BACKGROUND

I. Field

The present disclosure relates generally to communication, and more specifically to techniques for supporting device-to-device (D2D) communications in conjunction with wide area network (WAN) communications.

II. Background

Wireless communication networks are widely deployed to provide various types of communication content, such as voice, video, packet data, messaging, broadcast, etc. Wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

Deployments of mobile wireless systems (mobile WANs) have been growing vigorously since at least the 1980s. Early systems used analog technology and comprised various technologies deployed in different systems worldwide, such as Analogue Mobile Phone System (AMPS), used in the USA, Total Access Communication System (TACS), used in parts of Europe, Nordic Mobile Telephone (NMT), used in parts of Europe, and Japanese Total Access Communication System (J-TACS), used in Japan and Hong Kong. Such systems came to be referred to as "First Generation" (1G) systems.

Global roaming became possible with the development of a so-called "Second Generation" (2G) system called the Global System for Mobile communications (GSM). GSM was based on digital technology rather than the analog technology of the earlier 1G systems. Under the aegis of the European Telecommunications Standards Institute (ETSI), GSM developed into a well-regarded and widely deployed standard.

Advances in mobile user equipment (UE) technology resulted in conveniently small battery powered handsets and the like, further advancing the widespread acceptance of personal mobile communications. However, radio frequency spectrum is a limited shared resource, governed by regulatory bodies such as the International Telecommunication Union—Radiocommunication sector (ITU-R) and other regional and national regulators, all of whom determine in their respective jurisdictions how to allocate the radio frequency spectrum among the different types of services and technologies that seek to use it. This role is facilitated by the standardization of radio technologies. Among other things, standardization encourages interoperability of equipment from multiple vendors, fostering competition and resulting in reduced equipment cost. Standardization also promotes the efficient use of radio spectrum and the deployment of new and improved services.

The ITU-R has defined technology families and has associated specific ranges of the radio spectrum with these families. Two such families are the International Mobile Telecommunications (IMT) family, which includes so-called "Third Generation" (3G) systems; and the IMT-Advanced (IMT-A) family, which includes "Fourth Generation" (4G) systems. The designation of each new generation refers generally to a fundamental change in the nature of the technologies used, e.g., different multiple access schemes resulting in non-backwards-compatible transmission technology, higher peak bitrates, different frequency bands, wider channel frequency bandwidth, and higher capacity. New mobile generations have been introduced about every ten years since the early 1980s, when analog 1G systems were deployed. In the early 1990s, digital 2G systems were deployed. In the early 2000s, 3G systems using spread spectrum communication were deployed. In the early 2010s, 4G systems based entirely on packet-switched (PS) technology are being deployed.

A wireless communication network in accordance with the foregoing standards may include a number of base stations (also referred to as evolved Node Bs, eNBs, BSs, or access nodes) that can support communication for a number of UEs. In such a WAN, communication by UEs typically occurs via uplink/downlink channels between the UEs and a base station.

However, if two UEs are in the vicinity of each other, they may be enabled to communicate directly, that is, without communicating through the base station. A UE may thus be enabled to communicate peer-to-peer (P2P), also referred to as device-to-device (D2D), with one or more other UEs.

It may be thus desirable to efficiently support P2P and base station communications for UEs, such as by enabling new types of services, improving available services, eliminating interference, and/or reducing the traffic load on base stations.

SUMMARY

The herein disclosed apparatus, systems, and methods use Almost Blank Subframes (ABS) to manage interference between D2D and WAN transmissions. In particular, an eNodeB is disclosed comprising a controller module operable to obtain an indicator of a need for a quiescent subframe, and to select responsively thereto a subframe of a communication frame, and allocate the selected subframe as an Almost Blank Subframe (ABS). The base station includes a transceiver module operable to communicate the ABS over an air interface, and to send a misinformation signal to another eNodeB device indicating the ABS is not almost blank.

A user equipment in accordance with the herein disclosed apparatus, systems and methods may include at least one receiver module, and a radio frequency (RF) module. The RF module may be operable to receive an almost blank subframe (ABS) from the receiver and to at least perform an operation during the ABS that is appropriate for direct communication with a user equipment (UE) in a Device to Device (D2D) communication mode.

Various aspects and features of the disclosure are described in further detail below.

BRIEF DESCRIPTION OF THE DRAWINGS

FIG. 5 illustrates TDD uplink/downlink configurations relevant to the herein described apparatus, systems, and methods.

DETAILED DESCRIPTION

Figure 1:
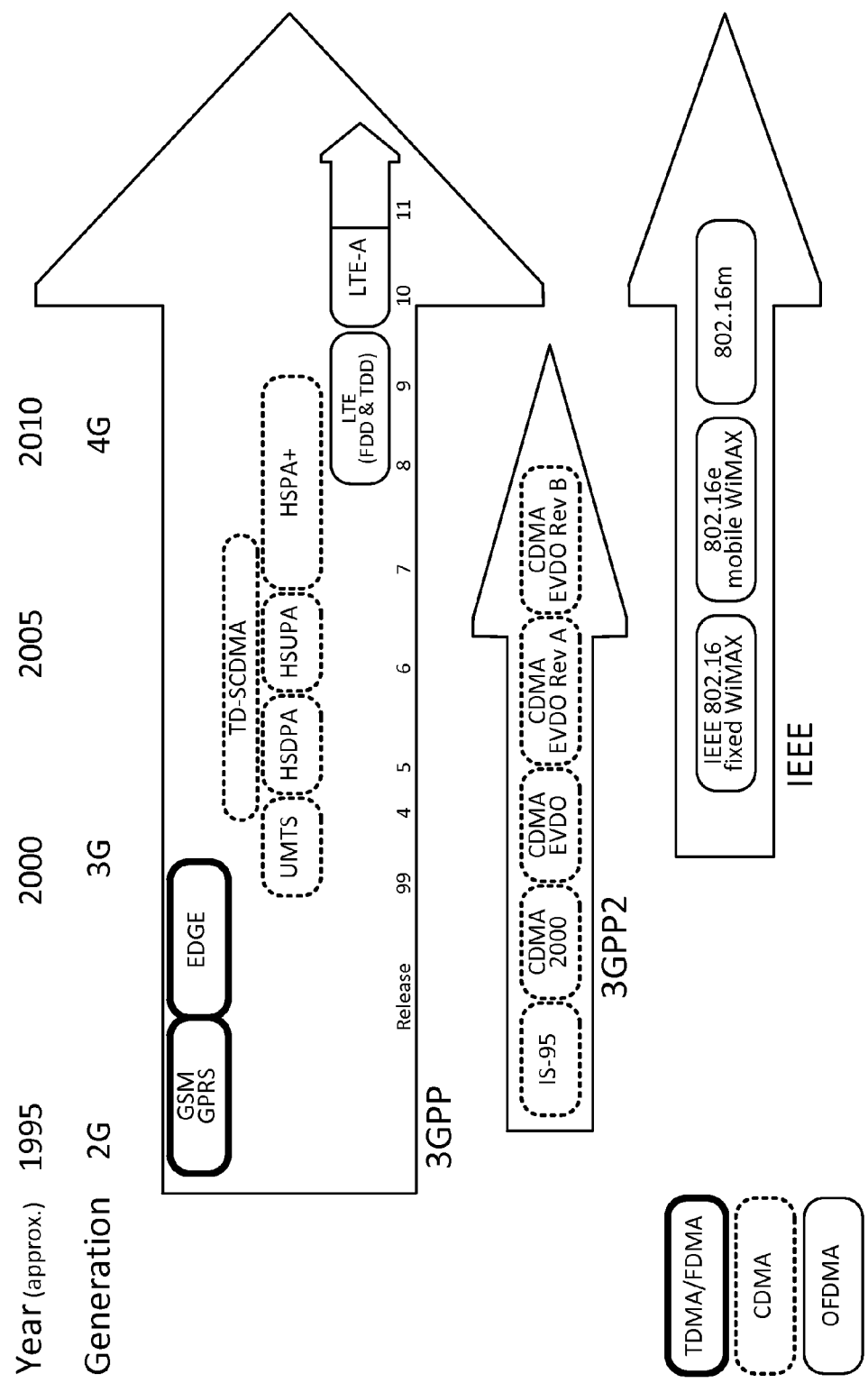
FIG. 1 illustrates the time periods, technology generations, major development groups, and various standards relating to wireless communications.

Figures and descriptions of the specification may have been simplified to illustrate elements that are relevant for clear understanding of the herein disclosed exemplary apparatus, systems, and methods, while eliminating for the purposes of clarity and brevity other elements ordinarily found in telecommunications apparatus, systems, and methods. Those of ordinary skill in the relevant arts may thus recognize other elements and/or steps that may be desirable or needed in implementing the disclosed embodiments. However, because such elements and steps are well known in the art, and because they do not facilitate a better understanding of the present invention, a discussion of such elements and may not be provided herein. The claims nevertheless include within their scope all variations and modifications to the disclosed embodiments that will be known or apparent to those skilled in the art in light of this disclosure.

The recent evolution of mobile telecommunications systems amounts to an ongoing series of advancements in cellular telecommunication systems. A cellular system is one that divides its service area into so-called cells, each with its own base station that communicates with and provides services to devices located within the cell using a communication channel arranged not to interfere with channels used in adjacent cells. Such a base station may be referred to as a NodeB, evolved NodeB, eNB, or a BS, by way of non-limiting example. Communicating devices used by end users in such a cell-based system may include stationary and mobile personal computers, laptops, netbooks, handsets, phones, etc., each of which may be referred to as a User Equipment (UE). The communication path from the NodeB to the UE may be referred to as the downlink (DL), while that from the UE to the NodeB may be referred to as the uplink (UL).

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. UTRA includes Wideband CDMA (WCDMA), Time Division Synchronous CDMA (TD-SCDMA), and other variants of CDMA, and cdma2000 covers IS-2000, IS-95, and IS-856 standards. A TDMA network may implement a radio technology, such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, and the like. UTRA and E-UTRA are part of Universal Mobile Telecommunication System (UMTS). 3GPP Long Term Evolution (LTE) and LTE-Advanced (LTE-A), in both Frequency Division Duplex (FDD) and Time Division Duplex (TDD), are new releases of UMTS that use E-UTRA. UTRA, E-UTRA, UMTS, LTE, LTE-A and GSM are described in documents from an organization named "3rd Generation Partnership Project" (3GPP). UMB and cdma2000 are described in documents from an organization named "3rd Generation Partnership Project 2" (3GPP2). The techniques described herein may be used for the wireless networks and radio technologies mentioned above, as well as for other wireless networks and radio technologies.

Three organizations guide the development of standards conforming to the International Mobile Telecommunications (IMT) requirements (which includes so-called "Third Generation" (3G) systems) and the IMT-Advanced (IMT-A) requirements (which includes so-called "Fourth Generation" (4G) systems). These organizations are the 3rd Generation Partnership Project (3GPP), the 3GPP2, and the Institute of Electrical and Electronics Engineers (IEEE). The standards organizations and the standards they have developed and promulgated are illustrated in FIG. 1.

In the systems promulgated and illustratively shown in FIG. 1, the physical or logical link that connects a data source (transmitter) to a data sink (receiver) is called a channel. Communications in which two devices may simultaneously send and receive signals between them are referred to as duplex communications. Systems that support duplex communications among a plurality of pairs of devices are called multiple access systems. The combining of multiple channels into a single shared channel is called multiplexing, the goal of which is generally to share a limited or expensive resource, such as radio spectrum.

Within the 3GPP developed standards, progressively more advanced multiple access technologies have been developed. TDMA and FDMA are used in 2G standards, including the GSM, General Packet Radio Service (GPRS), and Enhanced Data rates for GSM Evolution (EDGE). CDMA is used in 3G standards, including the UMTS and its progeny High Speed Downlink Packet Access (HSDPA), High Speed Uplink Packet Access (HSUPA), High Speed Packet Access (HSPA), and enhanced HSPA (HSPA+), some of which may use W-CDMA (which uses 5 MHz bandwidth carriers). Beginning with the LTE, 3GPP promulgated standards have employed OFDM. Unlike earlier systems which initially were were based on Circuit Switched (CS) technology, LTE was based from the start on Packet Switched (PS) technology.

LTE has been complemented by developments in non-radio aspects of a complete mobile communications system called System Architecture Evolution (SAE), which includes the Evolved Packet Core (EPC) network. Together, LTE and SAE make up the Evolved Packet System (EPS), in which the core network and the radio access network are entirely packet-switched.

The 3GPP supports standardization by producing highly detailed specification documents which are released in associated groups or series. For example, Release 8 (R8) describes the first version of LTE; and Release 10 (R10) describes the first version of LTE Advanced (LTE-A). Within each generation, an important consideration is to introduce new technology in a manner that is backward compatible with legacy equipment of the same generation. Such backward compatibility enables network operators to continue to provide services to existing subscribers using legacy UEs, while introducing new services and features that function only with newer UEs.

Figure 2:
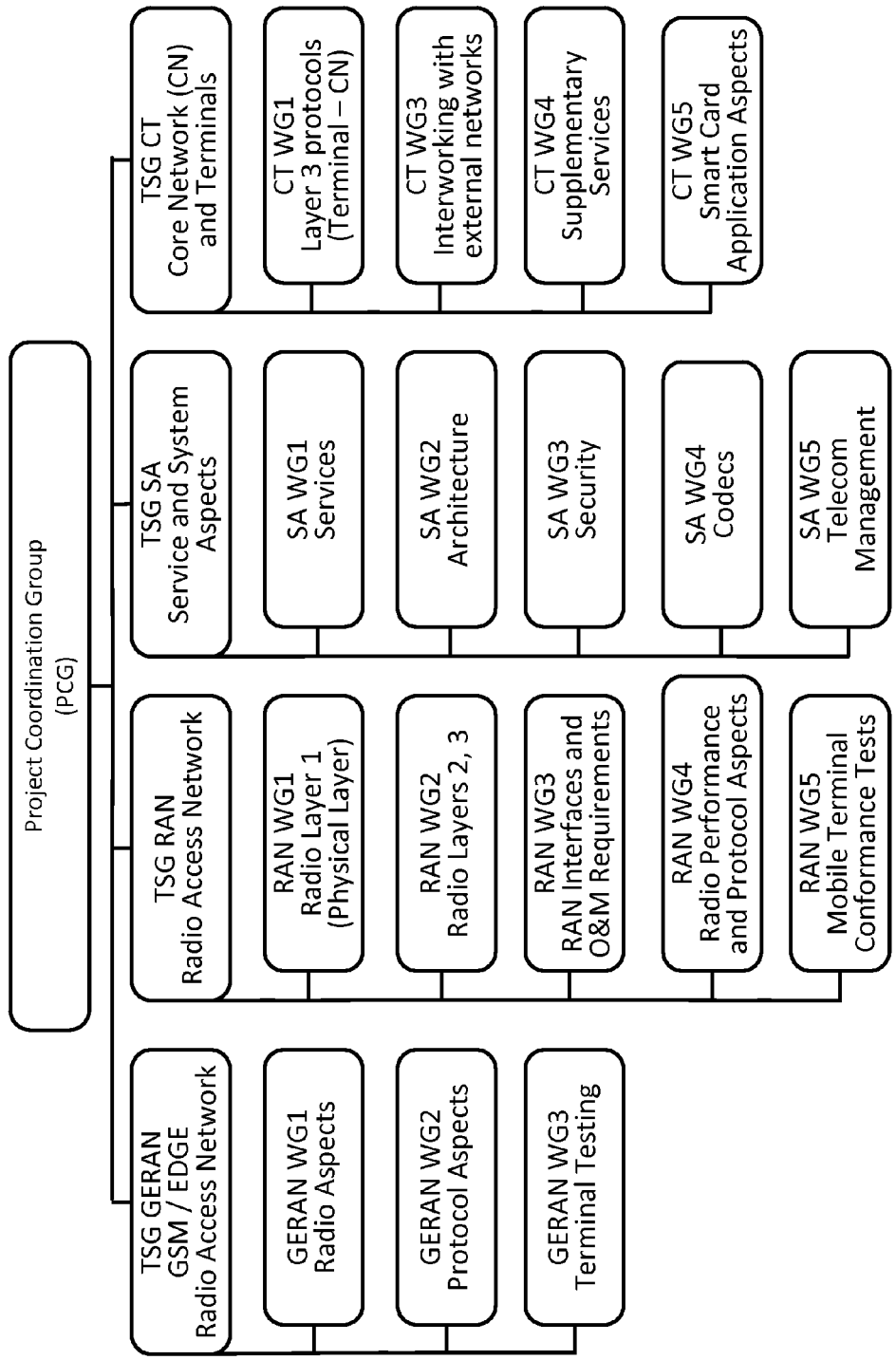
FIG. 2 illustrates the general organization of the standards developing groups of the 3GPP.

The 3GPP is divided into four Technical Specification Groups (TSGs), each of which comprises several Working Groups (WGs), as shown in FIG. 2. Each of the WGs works on a different aspect of developing technologies. In general, the documents produced by the 3GPP, such as technical reports and technical specifications, are presently available to the public at http://www.3gpp.org. During the course of developing standards, the WGs consider the technologies being developed holistically, taking into account issues such as performance, cost to implement, complexity, compatibility with earlier versions and deployments, and the like. The 3GPP documents pertaining to released standards and ongoing standards development that are available at www.3gpp.org as of the filing of the present disclosure are hereby incorporated herein by reference in their entirety as is fully set forth.

Figure 3A:
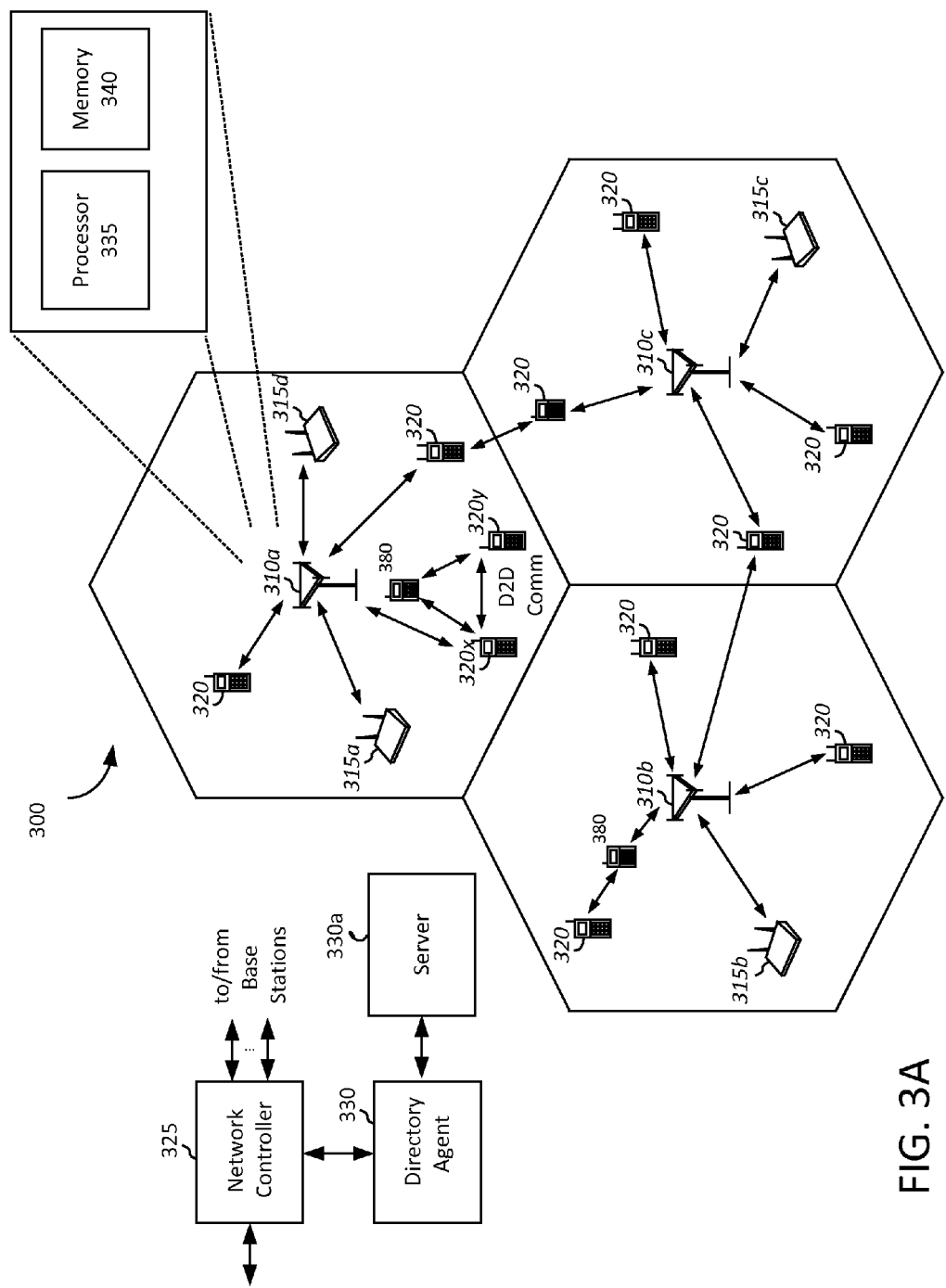
FIGS. 3A and 3B respectively illustrate an exemplary heterogeneous network (HetNet) and an interference scenario arising therein that is relevant to the herein described apparatus, systems, and methods.

UEs that are compliant with LTE release 10 and earlier are able to communicate directly only with eNodeBs in a so-called homogeneous configuration in which each eNodeB uses different carriers than all other eNodeBs having overlapping service areas. However, beginning with LTE release 11 so-called heterogeneous networks (hetnets) are supported, in which a plurality of eNodeBs with overlapping service areas use at least some of the same carriers. In a hetnet, the largest cell served by an eNodeB is called a macrocell. Smaller cells called picocells may deployed within or overlapping with the service area of the macrocell, each served by a lower power "pico" eNodeB that uses the same multiple access parameters as the macrocell's eNodeB. Even smaller femtocells may also be deployed within the service area of the macrocell, typically deployed by private parties without the permission or even knowledge of the macro cell operator. Each femtocell is served by an even lower power femto or "Home" eNodeB (HeNB) also using many of the same parameters as the macrocell's NodeB. Thus, each smaller cell shares at least one channel resource with the macrocell it is located in. A WAN can employ macrocells, picocells, and/or femtocells to provide wireless coverage in a variety of environments, ranging from open outdoor spaces to office buildings, homes, and underground areas. Together, the macro, pico, and femto eNodeBs provide a mosaic of coverage with handoff capabilities therebetween, typically with much better combined coverage and greater throughput than would be possible using conventionally placed macro eNodeBs alone. An exemplary arrangement of network elements in accordance with the herein disclosed apparatus, systems, and methods is shown in FIG. 3A.

Figure 3B:
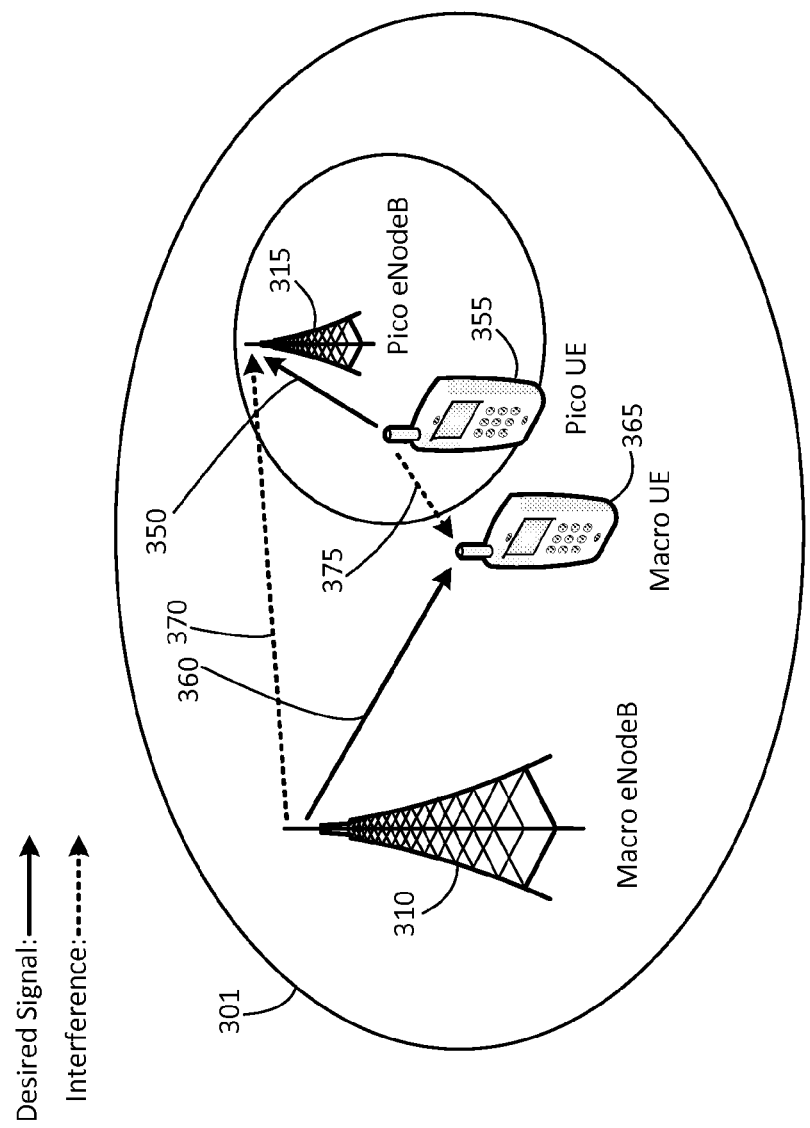

In such arrangements, interference can occur between the different devices that are using the same communication parameters for their own respective communications. For example, as shown in FIG. 3B, a macro eNodeB transmission to a macro UE can interfere with the reception at a pico eNodeB of a transmission from a pico UE. Conversely, the pico UE's transmission to the pico eNodeB may interfere with the reception at the macro UE of the macro eNodeB's transmission. In effect, transmissions from any transmitting device can interfere with the reception of other devices' transmissions when their intended receivers are near enough, and are using the same communication parameters for their own respective communications. Thus, the transmissions of every such device must be managed if such interference is to be avoided.

Direct communication between devices that operate at the same level within the network may be referred to as P2P, or D2D, communication. For example, direct communication between an eNodeB and another eNodeB or HeNB may be referred to as P2P. A UE communicating directly with another UE may also be referred to as P2P. One recent development in LTE-A is the ability of properly configured UEs to engage in D2D communications using the same carriers that are used by the macro eNodeB and smaller cell eNodeBs within whose service area one or both of the UEs are located. Such D2D communications may result in additional interference scenarios between the various devices that are using the same communication parameters.

In any interference scenario, a transmitting device that interferes with a communication session between two other devices is called an aggressor. The interference occurs when the aggressor transmits concurrently with a second device using the same communication parameters. The receiver that was intended to receive the second device's transmission is prevented from doing so by the aggressor's transmission. The receiver (i.e., the device whose operation is directly adversely affected by the aggressor) is referred to as a victim.

One way to avoid such interference is to schedule the transmissions of the various devices that are using the same shared radio resources such that no two transmitting devices transmit at the same time while they are both within range of an intended receiver of one of the two devices. Such scheduling may be accomplished using control signals. However, it is important to accomplish the scheduling in a manner that is backward compatible with legacy devices of the same generation, or in other words, that permits the legacy devices to operate as they normally would, while at the same time enabling newer devices to implement new features and capabilities.

More particularly, problematic interference can arise at a receiver when two transmitters are transmitting concurrently using the same channel resources, when both are within range of the receiver, but the receiver is the intended recipient of the transmissions of only one of them, referred to here as its partner. At the location of the receiver, the non-partner transmission is regarded as noise with respect to the partner transmission, and adversely affects the signal-to-noise ratio (SNR) of the partner transmission. If the non-partner signal is strong enough at the receiver, the partner signal becomes difficult or impossible to understand, i.e., it is overwhelmed by what it perceives as noise.

A different but related problem can occur even if the non-partner is not using the same channel resources as the receiver and its partner. Even when the non-partner transmission is using different channel resources, the non-partner transmission may deliver enough power on the partner channel at the receiver's location to adversely affect the SNR of the partner transmission at the receiver. A strong enough non-partner transmission can thereby desense the receiver with respect to the partner transmission, making it difficult or impossible to understand. Desensing must also be controlled where it may arise in a HetNet. Henceforth as used herein, the word "interference" and its derivatives includes desensing as well.

Returning now to FIG. 3A, shown is a wireless communication network 300, which may be a LTE network or other wireless network (also referred to herein as a wide area network, or WAN, or simply as a network). Wireless communication network 300 may include a number of base stations and other network entities. For simplicity, only three base stations

310*a*, 310*b*, and 310*c*, one network controller 325, and a directory agent 330 are shown in FIG. 3A. A base station (also referred to as BS, eNodeB, HeNB, eNB, or access point, for example) may be an entity that communicates with the devices. Each base station 310 may provide communication coverage for a particular geographic area, and may support communication for the devices located within the coverage area. To improve network capacity, the overall coverage area of a base station may be partitioned into multiple (e.g., three in the illustration) smaller areas. Each smaller area may be served by a respective base station subsystem. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, the 3GPP concept of "cell" is used throughout the disclosure.

WAN 300 may be a HetNet that includes base stations of different types, for example, macro base stations, pico base stations, home base stations, relays, and the like. Accordingly, a base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area (an office building or campus) and may allow unrestricted access by UEs with service subscription. A femto cell may cover an even smaller geographic area (e.g., a home) and may allow restricted access by UEs having association with the femto cell (e.g., UEs in a Closed Subscriber Group (CSG)). In the example shown in FIG. 3, WAN 300 includes macro base stations 310*a*, 310*b* and 310*c* for correspondent macro cells. WAN 300 may also include pico base stations 315*a*, 315*b*, 315*c*, and 315*d* for pico cells, and/or home base stations for femto cells.

Network controller 325 may couple to one or more base stations, and may provide coordination and control for these base stations. Network controller 325 may be a single network entity or a collection of network entities. Network controller 325 may communicate with the base stations via a backhaul, by way of non-limiting example. The base stations may also communicate with each another, for example, directly or indirectly via wireless or wireline backhaul.

Directory agent 330 may be a separate network entity and may be coupled to network controller 325 (as shown in FIG. 3A) and/or to other network entities. Directory agent 330 may also be part of a base station, or network controller 325, or some other network entity not shown in FIG. 3A. Directory agent 330 may further include, or be communicatively associated with, server 330*a*. Directory agent 330 may support the setup of D2D communication, such as by providing certain identifying information of user devices, as described further below.

Processor/controller 335 may be associated with, or form part of, network controller 325. Processor/controller 335 may also be, or form part of, or be distinct from, server 330*a*, and may be associated with a correspondent memory 340 that may be, form part of, or be distinct from, directory agent 330. Processor/controller 335 may include comparator capabilities, assessing capabilities, and like processing capabilities, and may be associated with information stored in a memory within, or associated with, directory agent 330. As such, processor/controller 335 may be within a base station 310*a*, and may provide the processing and calculation functions described herein.

User equipments (UEs) 320 may be disposed throughout the wireless network, and each device may be stationary or mobile. A UE may also be referred to as a user device, a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, a peripheral device (e.g., a printer), or the like. A UE may communicate with a base station in a wireless network. A UE may also communicate with other UEs using D2D communications. In the example shown in FIG. 3A, UEs 320*x* and 320*y* may communicate D2D. Other UEs 320 may communicate with base stations 310*a*, 310*b*, 310*c*, and UEs 320*x* and 320*y* may also be capable of communicating with the base stations, e.g., when not engaged in D2D communication or concurrently with D2D communication. D2D communication may be used to offload data traffic in order to reduce congestion on the radio interface, on WAN network 300, as well as on a core network (not shown).

As illustrated in FIG. 3A, WAN 300 may also include relays 380. A relay may be any entity that receives a transmission of data from an upstream entity (such as a base station or a UE) and sends a transmission of the data to a downstream entity (such as another UE or base station), that relays data, typically without modification. A relay may be a UE that relays transmissions for other UEs, or a base station that relays transmissions, or any other independent relay device or node. Those skilled in the art will appreciate that relays may be disposed throughout the networks, cells, and systems herein described.

In the description herein, WAN communication refers to communication between a UE and a base station, such as for a call between the UE and a remote entity like another UE, via the base station. A WAN link, and variants thereof, as used herein, thus refers to a communication link between a UE and a base station. In contrast, a D2D communication, as used herein, refers to direct communication between two or more UEs, wherein at least a portion of the direct communication occurs without going through a base station. A D2D link, or variants thereof, thus refers to a direct communication link between two or more UEs engaged in D2D communication. Correspondingly, a WAN UE is a UE that is interested or engaged in WAN communication, and a D2D UE is a UE that is interested or engaged in D2D communication. Similarly, a macro UE is a UE that is interested or engaged in WAN communication with a macro eNodeB, and a pico UE is a UE that is interested or engages in WAN communication with a pico eNodeB.

Downlink (DL) transmissions from an eNodeB to a UE, as shown in FIG. 3A, in an LTE or LTE-A system comprise so-called user-plane and control-plane data. In effect, a downlink transmission comprises a plurality of channels, each one of which is used to transmit either user content or control signaling that coordinates the resources needed to send the user content in a manner that can be understood by its intended recipient. A plurality of such transmissions may be sent concurrently, multiplexed by manipulating physical layer signaling in the multiple access scheme of OFDMA. OFDMA divides the transmitted signal along small units of time and frequency. Uplink (UL) transmissions from a UE to a base station also comprise user-plane and control-plane data. The multiple access scheme used in the uplink is SC-FDMA.

The herein disclosed apparatus, systems, and methods pertain primarily to DL and D2D communications. In an LTE network, carrier capacity during subframes that would ordinarily be allocated for sending DL information from a macro eNodeB to UEs can instead be reallocated for use in D2D communications occurring directly between UEs. In addition, since the eNodeB may no longer be sending DL transmissions during these subframes, any interference (or desense) that would otherwise have been caused by such DL transmissions at devices other than the D2D UEs is mitigated.

For example, referring now again to FIG. 3B, a pico eNodeB 315 in the macro eNodeB's 310 service area 301 is receiving a Physical Uplink Control Channel (PUCCH) Radio Bearer (RB) 350 from pico UE 355. A macro eNodeB downlink transmission 360 to a neighboring macro UE 365 may interfere 370 with the pico eNodeB's PUCCH reception. If so, rescheduling the macro eNodeB's transmission to a different subframe would eliminate that interference. Similarly, the rescheduling would also eliminate interference 375 that would otherwise be experienced by the macro UE 365 receiving the macro eNodeB's DL 360, due to the pico UE's PUCCH transmission 350 to the pico eNodeB 315.

Ideally, the subframe that originally contained the macro eNodeB data that was rescheduled would be completely blank, eliminating even the possibility of interference toward the UEs engaged in D2D communications during that subframe. However, for practical reasons, such as to maintain backward compatibility with prior art UEs, the DL subframe is not typically completely blank. For example, to ensure cells remain accessible and measureable to such UEs, certain control signals, such as the cell-specific Reference Signal (RS), Primary Synchronization Signal (PSS), Secondary Synchronization Signal (SSS), and the Paging Channel (PCH) and Physical Broadcast Channel (PBCH), remain. Accordingly, the subframe is generally almost blank, and is thus referred to as an Almost Blank Subframe (ABS). However, even though the ABS must still contain certain signals, the energy conveyed in the ABS is much less than a normal subframe, and therefore reduces interference with the UEs' D2D communications.

In addition, LTE may be enhanced by implementing Time Division Multiplex (TDM) partitioning between D2D UEs and any nearby small cell eNodeBs to prevent interference between them. No such enhancement is needed with regard to UL communications however, because partitioning of the Frequency Division Multiplex (FDM) used in the LTE uplink is already provided for in the LTE standard.

Figure 4:
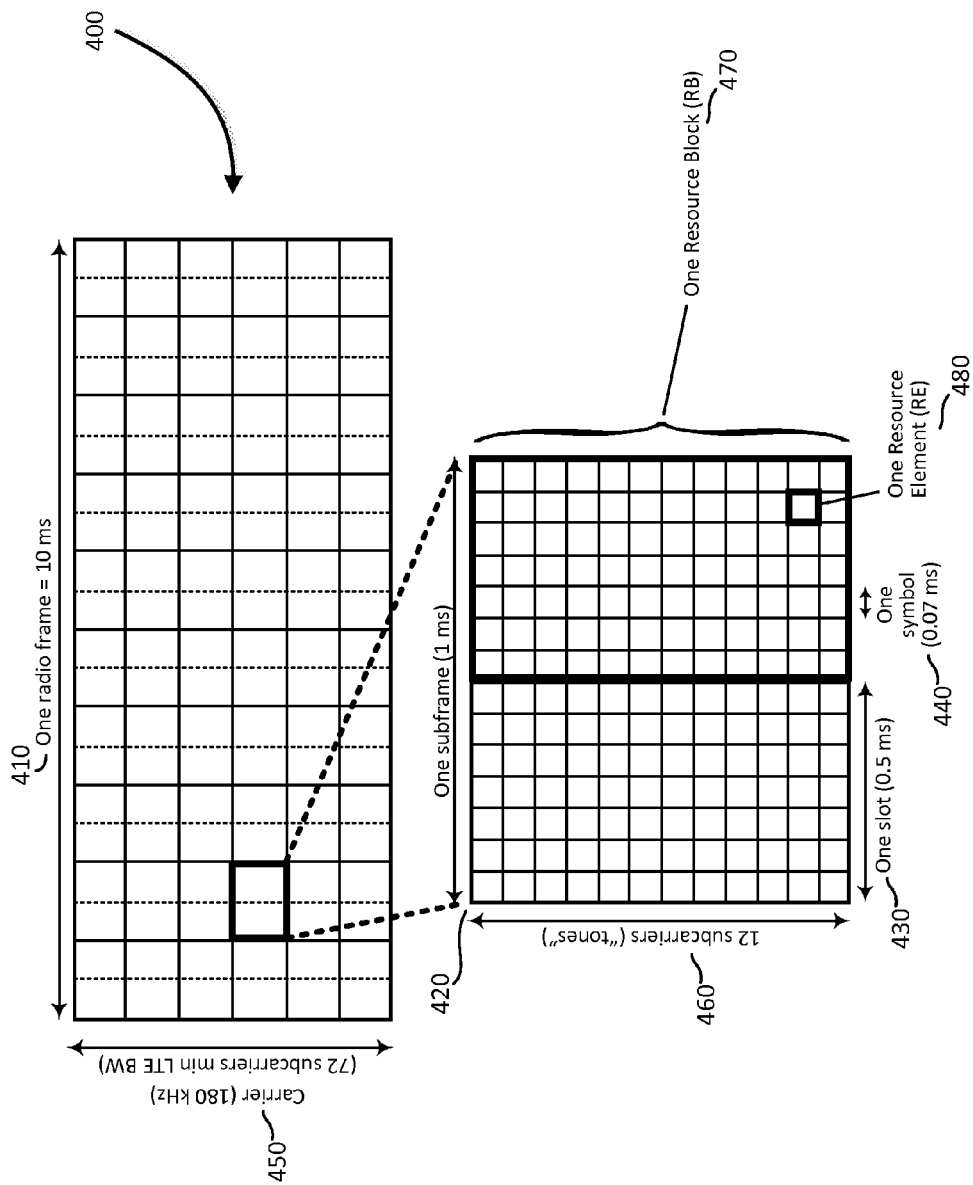
FIG. 4 illustrates the organization of radio frames in LTE wireless communications.

FIG. 4 illustrates the structure 400 of radio resources most commonly used in DL transmissions by the herein disclosed apparatus, systems, and methods, although other frame, subframe, or like information-carrying structures may also be used. The DL transmission resources in LTE can be described in terms of space, time, and frequency. The spatial dimension contains one or more layers (only one of which is shown), each layer representing an antenna port at the eNodeB. For each antenna port, a Reference Signal (RS) is provided to enable the User Equipment (UE) to locate the radio channel. In the embodiments disclosed herein, only one antenna port is considered, but the disclosure can be extended to include a plurality of ports.

In the time dimension, for each transmit antenna port the largest unit of time is the radio frame 410, which has a duration of 10 ms. Each radio frame is subdivided into ten 1 ms subframes 420, and each of the subframes is split into two 0.5 ms slots 430. Each slot comprises seven OFDM symbols 440 in the case of the normal Cyclic Prefix (CP) length, or six (not shown) if the extended CP is configured in the cell. In the frequency domain, the largest unit is called a carrier 450, which has a bandwidth of at least 180 kHz. Each carrier is divided into at least 12 subcarriers or "tones" 460, each with a spacing of 15 kHz. One carrier (12 subcarriers) for a duration of one slot is called a Resource Block (RB) 470. The smallest unit of resource consists of one subcarrier for a duration of one OFDM symbol, called a Resource Element (RE) 480. An RB thus comprises 84 REs using a normal cyclic prefix length, and 72 REs using the extended cyclic prefix. FIG. 4 illustrates the resource structure using the normal cyclic prefix length.

FIG. 5 is a table showing TDD uplink/downlink configurations that may be used in the herein disclosed apparatus, systems, and methods. As shown in the table, the letter D indicates that the sub-frame is a downlink sub-frame, the letter U indicates that the sub-frame is an uplink sub-frame, and the letter S indicates that the corresponding sub-frame is a "special" sub-frame. In a so-called special subframe, the beginning portion is utilized for downlink transmission, and the ending portion is utilized for uplink transmission. A silence or "guard" region is arranged in the middle of the special sub-frame between the downlink and uplink portions. In the illustration, there are seven kinds of configurations defined for TDD subframes, each having different ratios of uplink to downlink subframes. The different configurations allow a variety of DL/UL ratios and switching periodicities to be implemented as needed.

In an illustrative scenario, TDD configuration 3 may be being used in a particular macro cell to schedule UL and DL transmissions. As shown in FIG. 5, subframe 4 of TDD configuration 3 comprises six DL subframes, three UL subframes, and one special subframe. One way to accommodate D2D communication among UEs in its coverage area is for the macrocell eNodeB to provide quiescent subframes in its coverage area during which UEs which are capable of doing so may engage in D2D communications, without problematic interference from other devices transmitting at the same time using the same resources. To do so, the eNB can switch from TDD configuration 3 to a TDD configuration that provides one or more additional DL subframes, thereby allowing the eNodeB to gain control over the additional subframe(s). The eNB then informs other devices in its service area that it has done so. In this exemplary case, as shown in FIG. 5, TDD configuration 4 has seven DL subframes, one more than TDD configuration 3. The additional DL subframe is subframe 4 of TDD configuration 4, which is now a DL instead of an UL subframe. Thus, the macro eNB, in addition to selecting a TDD configuration that provides UL and DL resources appropriate for the transmissions it participates in itself, may additionally select a TDD configuration that will provide quiescent subframes in which D2D communications may proceed. The eNB accomplishes that by selecting a new TDD configuration that adds one or more DL subframes, i.e., that modifies the downlink/uplink configuration, to the number otherwise provided for by the TDD configuration that it selected based only on the needs/factors associated with the eNB. Thus, in TDD configuration 4, subframe 4 is now a DL subframe, and the eNB informs other devices in its coverage area that the new TDD configuration being used in configuration 4.

The macro eNodeB thereby gains control over subframe 4 in this scenario. To provide a quiescent frame in which D2D communications may proceed, the eNB ensures that frame 4 remains quiescent, for example, by scheduling subframe 4 as an ABS. Note that it may be advantageous to include control signaling, such as CRS, PSS, and SSS, in the ABS. Those signals in an ABS are ignored by R11 and R12 UEs, so that they may engage in HetNet communications and D2D communications, respectively. The macro eNodeB informs R10 and other prior art UEs in the macrocell that it has made subframe 4 an ABS, so that they can modify their measurements accordingly, and they will continue to monitor those frames for control signaling, per above, but will not affirmatively attempt communication due to modification of those subframes from uplink to downlink. In addition, the macro eNodeB informs R12 UEs that subframe 4 is an ABS and available for D2D communications.

To ensure the ABS remains quiescent, the eNB may suppress small cell eNodeBs from transmitting and interfering with the R12 UEs' D2D communications, such as by misinforming the small cell eNodeBs, via the X2 or S1 interface, that subframe 4 is an ordinary TDD configuration 3 UL subframe and not an ABS. In an embodiment, the eNB may simply refrain from informing the pico/femto eNBs that it has implemented a different TDD configuration. Consequently, because a small cell eNodeB will believe that macro UEs are engaged in UL transmissions, it will not transmit during subframe 4. Further, macro UEs will not engage in UL transmissions because the previously UL frame is now a DL frame. Finally, the macro eNB itself transmits as little as it can without disrupting the operation of the macro cell, by configuring the new DL subframe as an ABS. The result is that, for the duration of the ABS, the R12 UEs can engage in D2D communications without undue interference from other devices in the macro cell.

None of these procedures creates any issues with regard to any UE uplink (UL) communications with the macro eNodeB, at least because the ABS is nominally a DL subframe. Consequently, the DL subframe is not available to transmit Physical Hybrid ARQ Indicator Channel (PHICH) messages or Physical Downlink Control Channel (PDCCH) messages, for example. As usual however, the macro eNodeB downlink (DL) may still utilize the ABS for control messaging, such as Asynchronous Hybrid Automatic Repeat reQuest (HARQ) messaging, for example.

The macro eNB may execute the foregoing modification to the at least one subframe modified from a UL to a DL subframe for any reasons known to those skilled in the art. By way of non-limiting example, the macro eNB may sense the presence in its cell of R12 UEs capable of D2D communications, or of R11 UEs capable of HetNet communications. Likewise, and by way of non-limiting example, the macro eNB may receive a request for resources for D2D communications or for HetNet communications.

Figure 6:
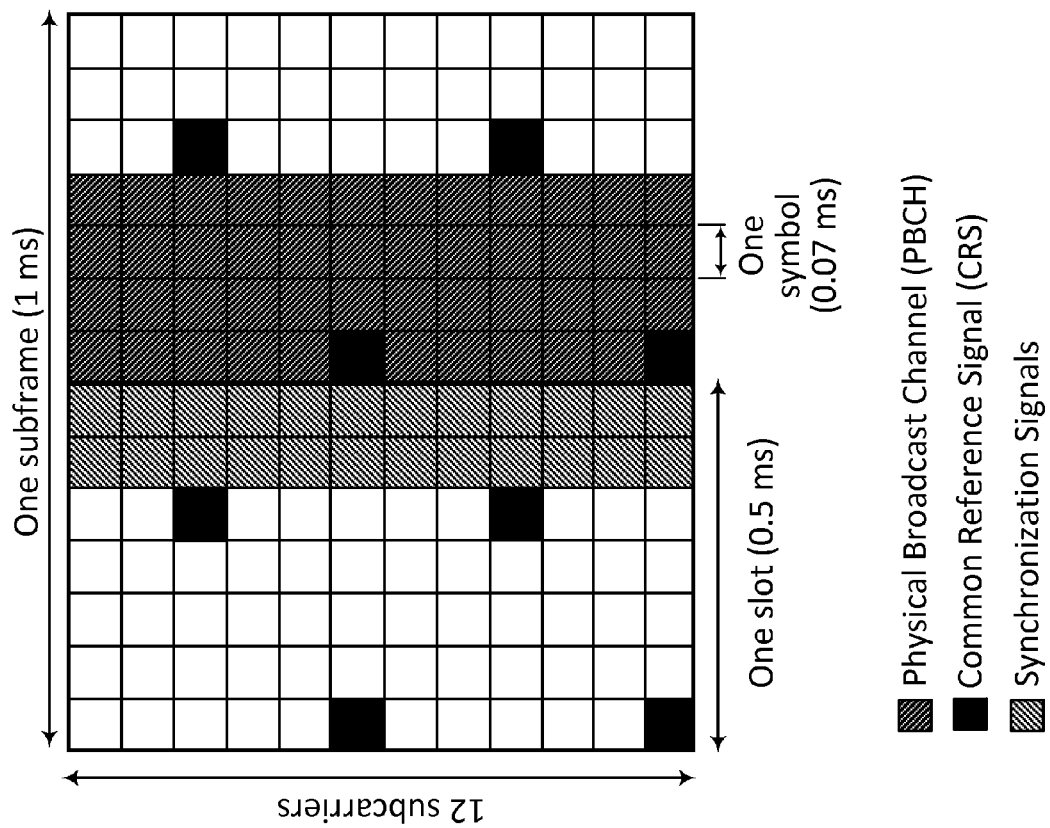
FIG. 6 illustrates an almost blank subframe (ABS) relevant to the herein described apparatus, systems, and methods.

FIG. 6 illustrates an exemplary ABS that may be used in accordance with the herein disclosed apparatus, systems, and methods. As shown, the ABS contains control signaling such as PBCH, CRS, and synchronization signals. Nevertheless, more than half of the ABS remains blank.

Figure 7:
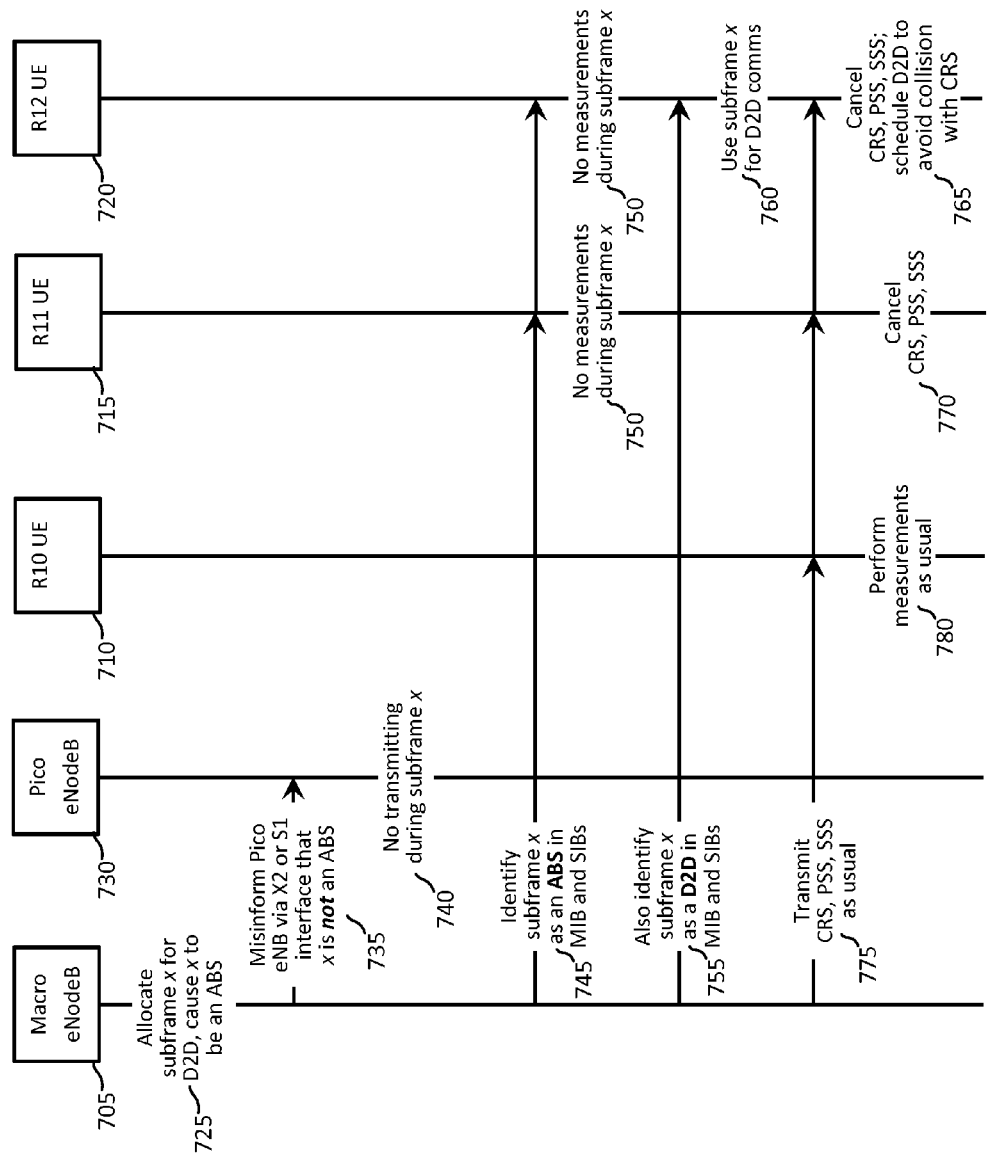
FIG. 7 shows a process for supporting D2D communications in accordance with the herein described apparatus, systems, and methods.

FIG. 7 illustrates an exemplary scenario in accordance with the herein disclosed apparatus, systems, and methods. Assume subframe x is being used for UL communications to macro eNodeB 705 from macro UEs 710, 715, 720 in its coverage area. To support D2D communications, the macro eNodeB can reschedule at least the user plane data of subframe x, and allocate subframe x for D2D communication, 725. Accordingly, the macro eNodeB causes subframe x to be an ABS, for example, by forming the ABS itself, or by directing another network element such as a small cell eNB to form the ABS. However, to prevent small cell eNodeBs in the macro eNodeB's coverage area from transmitting during the ABS, the macro eNodeB informs the small cell eNodeBs (via the X2 or S1 interface) that subframe x is not an ABS subframe, 735. In an embodiment, the macro eNB informs the small cell eNB(s) that subframe x is a DL frame, but refrains from informing them that it is an ABS. In that case, because the small cell eNodeBs believe the macro eNodeB is using subframe x as an ordinary DL subframe, they do not transmit on that subframe, 740. Alternatively, the macro eNB may simply refrain from informing the small cell eNB(s) that it has selected a different TDD configuration. In that case, the small cell eNB(s) believe subframe x is still an UL subframe being used by macro UEs for UL communications to the macro eNB, and will still not transmit on that subframe, 740.

The macro eNodeB identifies subframe x as an ABS in the Master Information Block (MIB) and System Information Blocks (SIBs), 745. Because R11 and R12 UEs obtain information about macro frames from the MIB and SIBs, those UEs understand subframe x is an ABS, and do not perform measurements thereon, 750. However, the macro eNodeB also identifies subframe x as a D2D subframe in the MIB and SIBs, 755. As a result, R12 UEs understand they are free to use subframe x for D2D communications, 760. Of course, to maintain the smooth operation of prior art UEs in the macro cell, the macro eNB will continue to ensure that CRS, PSS, and SSS signals are provided, 775. During D2D communications, the R12 UEs may be configured to cancel one or more of those signals, 765. Similarly, R11 UEs may be configured to cancel one or more of those signals, 770, when they communicate with a small cell eNodeB instead of with the macrocell eNodeB.

As noted, to maintain backward compatibility with R10 and older UEs is desired, the macro eNodeB transmits the CRS, PSS, and SSS signaling as applicable on subframe x. The R11 and R12 UEs will not use that signaling for measurements, but R10 and older UEs will perform measurements based on the signals as usual, 780.

In an embodiment, D2D communication between R12 UEs can be scheduled to avoid interfering with the CRS transmissions, such as in order to prevent R10 and older UEs from being interfered with, and wrongly determining that a radio link failure has occurred. For example, the Resource Elements (REs) used for CRS signaling (i.e., the symbol, tone) can be ignored by the R12 UEs, or the entire symbol that contains those REs can be ignored.

Figures 8A, 8B:
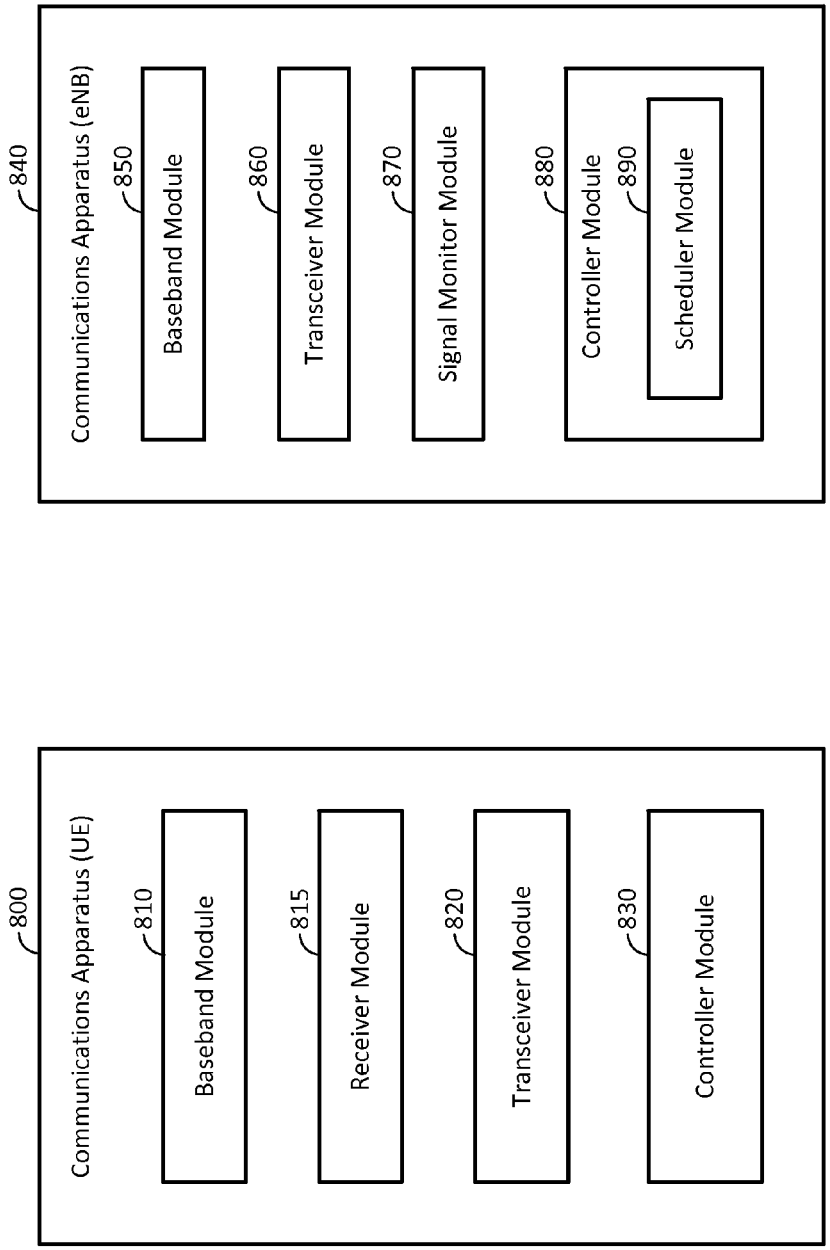
FIGS. 8A and 8B show block diagrams of a UE and a base station, respectively, in accordance with the herein described apparatus, systems, and methods.

FIG. 8A is a block diagram of a communications apparatus in accordance with an aspect of the herein disclosed apparatus, systems, and methods. The communications apparatus 800 may, for example, be a UE disposed in the network illustrated in FIG. 3A. The operation of the network may be in compliance with LTE or LTE-A standards. Apparatus 800 comprises a baseband module 810, a receiver module 815, a Radio Frequency (RF) transceiver module 820, and a controller module 830. The baseband module 810 may comprise a plurality of hardware devices configured to perform baseband signal processing, such as Analog to Digital Conversion (ADC), Digital to Analog Conversion (DAC), gain adjusting, modulation, demodulation, encoding, decoding, and so on. The receiver module 815 may comprise an antenna and other components arranged to receive wireless RF signals. Transceiver module 820 may obtain RF signals from the receiver, and convert the obtained signals to baseband signals which are processed by the baseband module 810. Conversely, transceiver module 820 may receive baseband signals from the baseband module 810, convert the received baseband signals to RF signals, and wirelessly transmit the RF signals via a transmitter. RF module 820 may also comprise one or more hardware devices to perform radio frequency conversion. For example, RF module 820 may comprise a mixer to multiply the baseband signals with a carrier oscillated at a radio frequency of the wireless communications system, wherein the radio frequency may be, for example, 900 MHz, 1900 MHz, or 2100 MHz as utilized in UMTS, or 900 MHz, 2100 MHz, or 2.6 GHz as utilized in LTE systems, or other frequencies depending on the radio access technology being used. Controller module 830 controls the operation of baseband module 810, receiver module 815, and transceiver module 820, as well as other functional components such as a display, keypad, a non-transitory storage unit storing data and application program code, communication protocols, or the like.

FIG. 8B is a block diagram illustrating a communication apparatus in accordance with another aspect of the herein disclosed apparatus, systems, and methods. Communications apparatus 840 may, for example, be an evolved NodeB (eNB) in a network such as that shown in FIG. 3A. Communications apparatus 840 comprises a baseband module 850, a transceiver module 860, a signal monitor module 870, and a controller module 880. The transceiver module 860 may cause signals to be transmitted and received via wireless and/or wired connection. Further, the eNB may transmit control or/and data signals to one or more UEs, for example over an air interface, and may communicate with other eNBs via wireless or wired connection, such as via an X2 or S1 interface, a network controller, a core network device, or the like. For example, in exemplary embodiments, the transceiver module may communicate with other eNBs via backhaul connection. The operation of baseband module 850 and the controller module 880 are similar to that of the baseband module 810 and the controller module 830 described previously. Note that because the eNB communicates directly with UEs and other devices in its coverage area, the controller module 880 may also schedule the transmission of control signals and data to the UE(s) and other devices in its service area. As such, the controller module 880 may include a scheduler module 890 arranged to schedule control signal and data transmissions.

Figure 9:
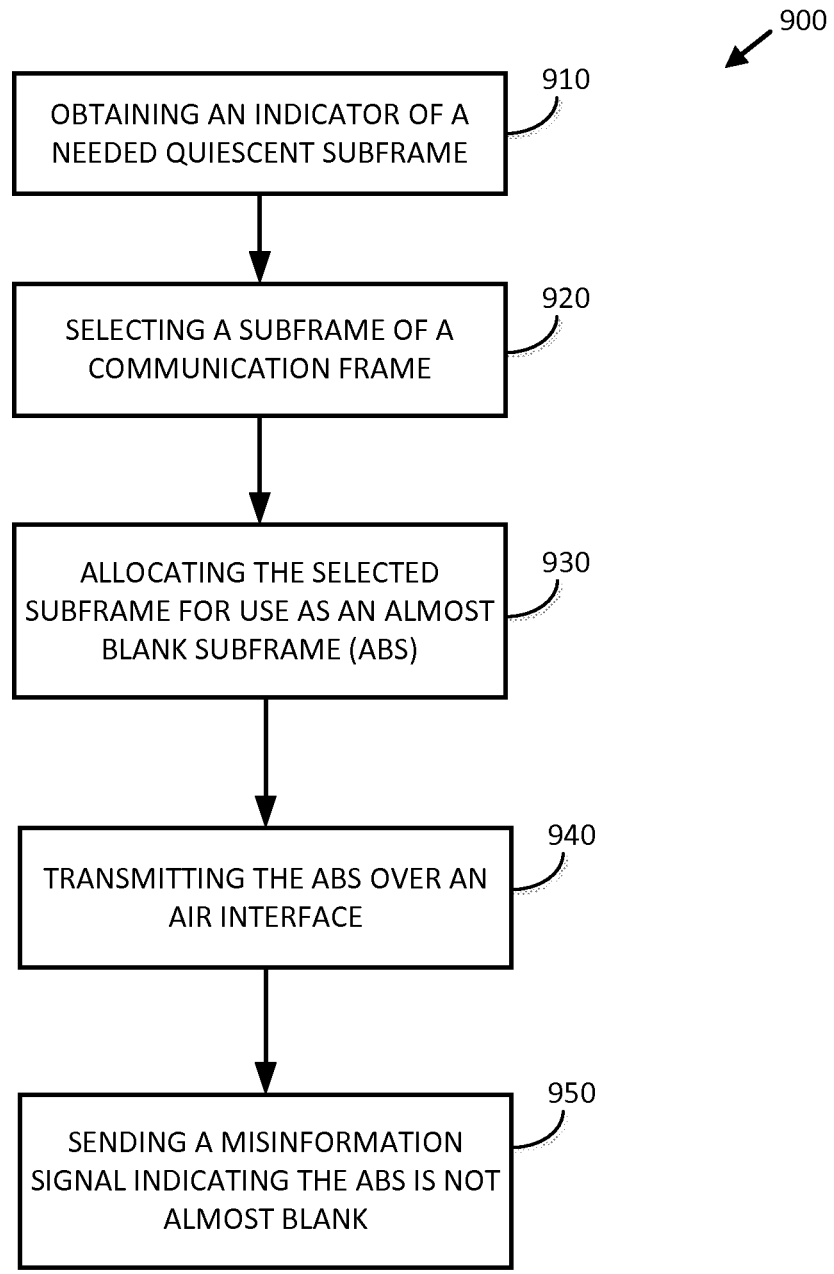
FIG. 9 shows a method, operable by a network entity such as a base station, in accordance with the herein described apparatus, systems, and methods.

FIG. 9 is a block diagram illustrating a method 900 for use with the disclosed apparatus and systems. In the figure, an apparatus, which may be a base station/eNB, obtains an indicator of a needed quiescent subframe, 910. For example, the eNB may sense the presence in its cell of one or more R12 UEs capable of D2D communications, and/or may receive a request for D2D communications. In response the apparatus selects a subframe of a communication frame, 920, and allocates the selected subframe for use as an almost blank subframe (ABS), 930. That is, at steps 920 and 930, the apparatus may modify the communication configuration of the subframes. The apparatus transmits the ABS over an air interface, 940. In addition, the apparatus may send a misinformation signal indicating the ABS is not almost blank, 950.

Figure 10:
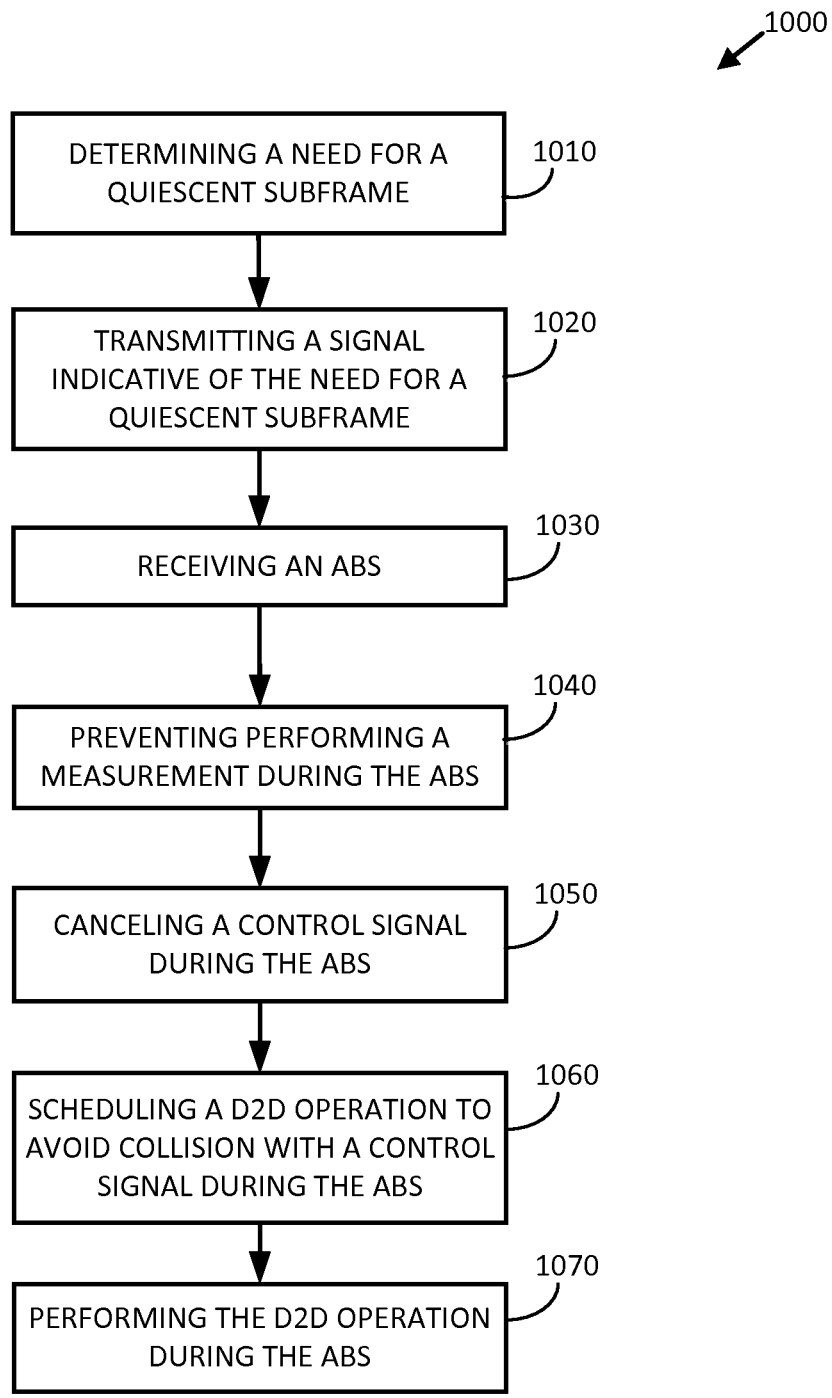
FIG. 10 shows a method, operable by a network entity such as a user equipment (UE), in accordance with the herein described apparatus, systems, and methods.

FIG. 10 is a block diagram illustrating a method 1000 for use with the disclosed apparatus and systems. In the figure, an apparatus, which may be a UE that is capable of D2D communications, determines a need for a quiescent subframe, 1010, for example, so that it can engage in D2D communications without undue interference. The apparatus transmits a signal indicative of the need for a quiescent subframe, 1020. The apparatus then receives an ABS, 1030, which may be provided in response to its transmitted indicator signal. During the ABS, the apparatus prevents performing a measurement, such as a measurement based on control signals of the ABS, 1040. Further, the apparatus cancels at least one control signal during the ABS, 1050. Preferably, the apparatus schedules a D2D operation such that the operation, which may be a D2D transmission, for example, will avoid collision with a control signal during the ABS, 1060. The apparatus then performs the D2D operation during the ABS, 1070.

Figure 11:
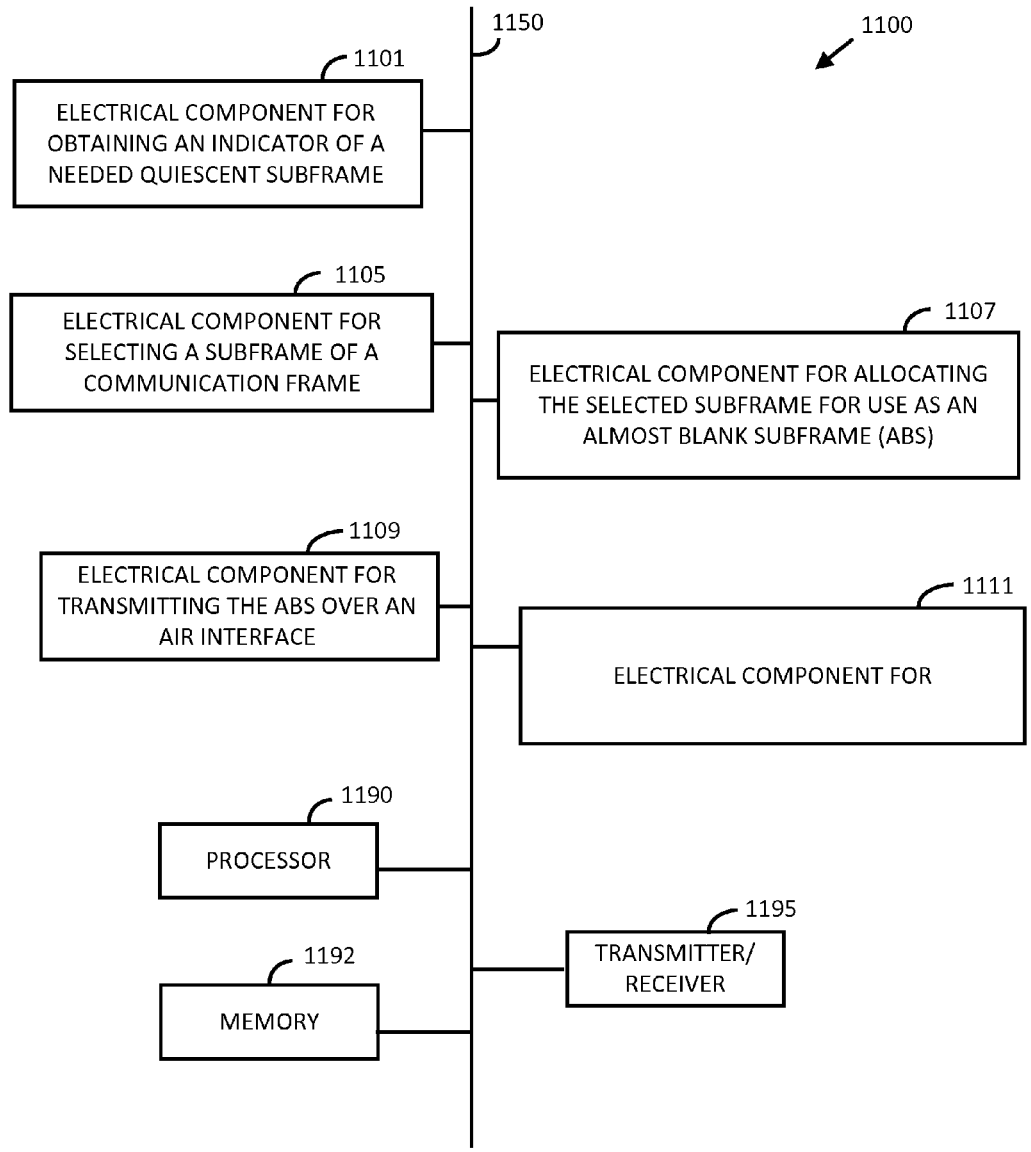
FIG. 11 is a block diagram illustrating an exemplary apparatus that may be configured as a base station in accordance with the herein described apparatus, systems, and methods.

FIG. 11 is a block diagram of an exemplary apparatus 1100 that may be configured as a network entity (e.g., a base station such as the eNB 840 in FIG. 8B) in a wireless network, or as a processor or similar device/component for use within the network entity. The apparatus 1100 may include functional blocks that represent functions implemented by an application specific processor, or software executing on a general purpose processor, or a combination thereof (e.g., firmware). As shown, apparatus 1100 includes a processor for executing computer code 1190, a memory or other storage device 1192 that may store the computer code and/or the results of the executed code, and a transmitter/receiver 1195 for communicating with other devices, all of which would be included in eNB 840. In addition, apparatus 1100 may include an electrical component or module 1101 for obtaining an indicator of a needed quiescent subframe (which may be included, e.g., in transceiver module 860 or signal monitor module 870). The apparatus 1100 may also include an electrical component or module 1105 for selecting a subframe of a communication frame (which may be included, e.g., in controller module 880). An electrical component or module 1107 may be included for allocating the selected subframe for use as an almost blank subframe (ABS) (which may be included, e.g., in scheduler module 890). The apparatus 1100 may also include an electrical component or module 1109 for transmitting the ABS over an air interface (which may be included, e.g., in transceiver module 860). The apparatus 1100 may also include an electrical component or module 1111 for sending a misinformation signal indicating the ABS is not almost blank (which may be included, e.g., in transceiver module 860).

Figure 12:
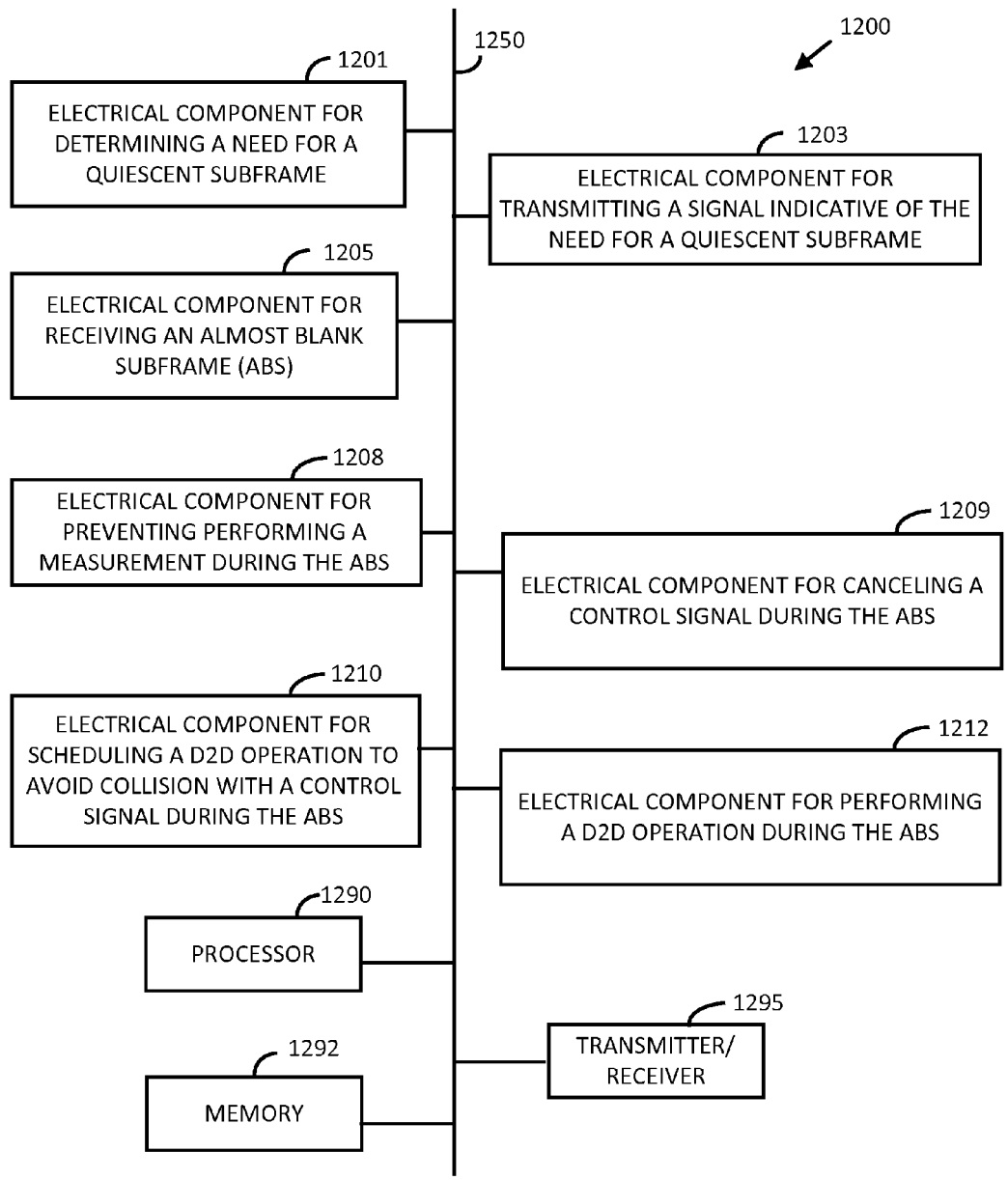
FIG. 12 is a block diagram illustrating an exemplary apparatus that may be configured as a UE in accordance with the herein described apparatus, systems, and methods.

With reference to FIG. 12, there is provided an exemplary apparatus 1200 that may be configured as a network entity (e.g., a UE such as the UE 800 in FIG. 8A) in a wireless network. The apparatus 1200 may include functional blocks that represent functions implemented by an application specific processor, or software executing on a general purpose processor, or a combination thereof (e.g., firmware). As shown, apparatus 1200 includes a processor for executing computer code 1290, a memory or other storage device 1292 that may store the computer code and/or the results of the executed code, and a transmitter/receiver 1295 for communicating with other devices, all of which would be included in UE 800. In addition, apparatus 1200 may include an electrical component or module 1201 for determining a need for a quiescent subframe, such as to engage in D2D communications (which may be included, e.g., in controller module 830). The apparatus may also include an electrical component or module 1203 for transmitting a signal indicative of the need for a quiescent subframe (which may be included, e.g., in transceiver module 820). The apparatus may also include an electrical component or module 1205 for receiving an almost blank subframe (ABS) (which may be included, e.g., in receiver module 815). The apparatus may also include an electrical component or module 1208 for preventing performing a measurement during the ABS, such as a measurement of synchronization signals (which may be included, e.g., in controller module 830). The apparatus may also include an electrical component or module 1209 for canceling a control signal during the ABS (which may also be included, e.g., in controller module 830). The apparatus may also include an electrical component or module 1210 for scheduling a D2D operation such that it avoids collision with a control signal during the ABS (which may also be included, e.g., in controller module 830). The apparatus may also include an electrical component or module 1212 for performing a D2D operation during the ABS (which may also be included, e.g., in controller module 830).

Figure 13:
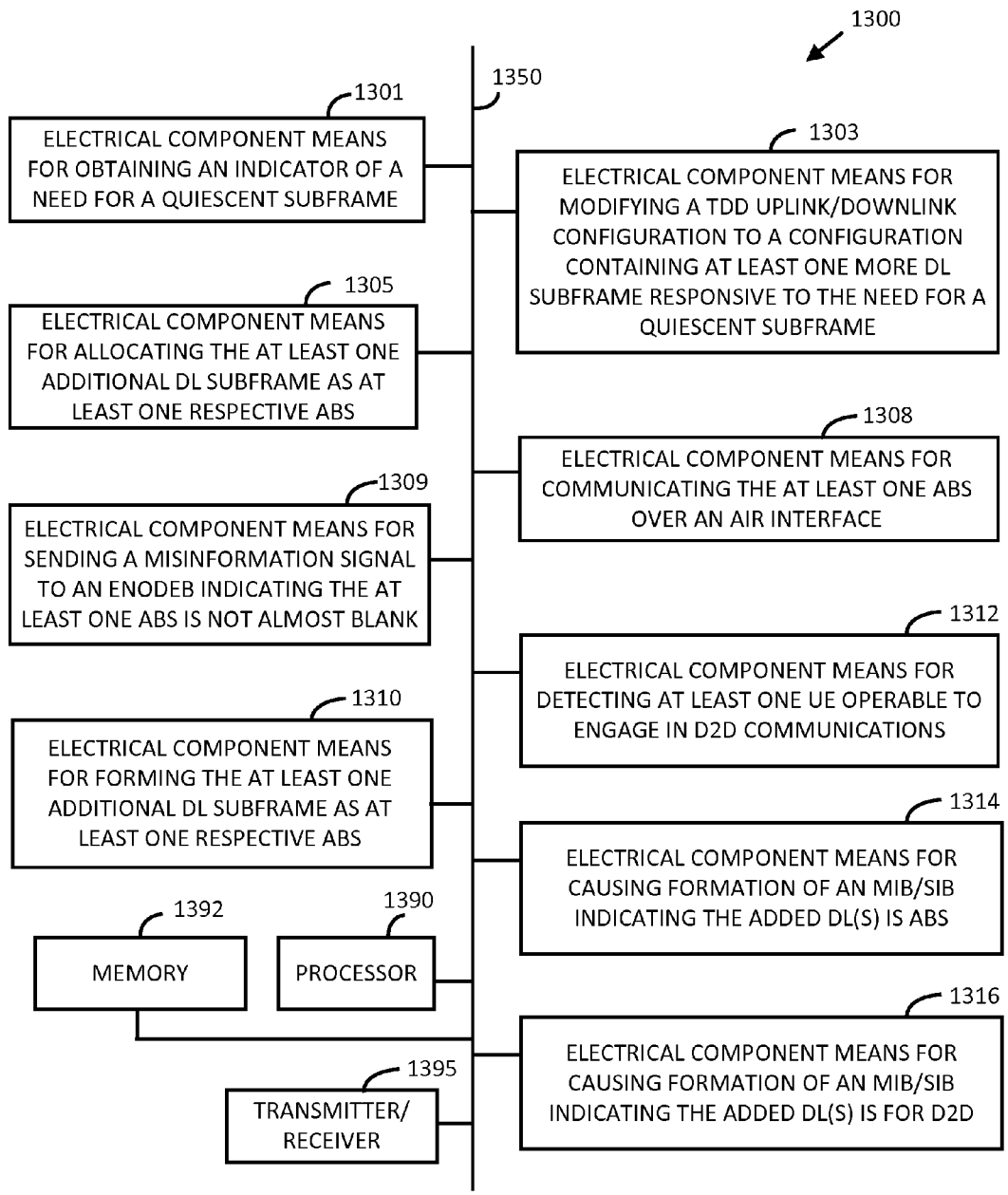
FIG. 13 is a block diagram illustrating an exemplary apparatus that may be configured as a base station in accordance with the herein described apparatus, systems, and methods.

FIG. 13 is a block diagram of an exemplary apparatus 1300 that may be configured as a network entity (e.g., a base station such as the eNB 840 in FIG. 8B) in a wireless network, or as a processor or similar device/component for use within the network entity. The apparatus 1300 may include functional blocks that represent functions implemented by an application specific processor, or software executing on a general purpose processor, or a combination thereof (e.g., firmware). As shown, apparatus 1300 includes a processor for executing computer code 1390, a memory or other storage device 1392 that may store the computer code and/or the results of the executed code, and a transmitter/receiver 1395 for communicating with other devices, all of which would be included in eNB 840. In addition, apparatus 1300 may include electrical component means 1301 for obtaining an indicator of a needed quiescent subframe (which may be included, e.g., in transceiver module 860 or signal monitor module 870). The apparatus 1300 may also include electrical component means 1303 for modifying a TDD uplink/downlink configuration to a configuration containing at least one more DL subframe responsive to the indicator of a needed quiescent subframe (which may be included, e.g., in controller module 880). The apparatus 1300 may also include electrical component means 1305 for allocating the at least one additional DL subframe as at least one respective ABS (which may be included, e.g., in controller module 880). Electrical component means 1308 may be included for communicating the at least one ABS over an air interface (which may be included, e.g., in transceiver module 860). The apparatus 1300 may also include electrical component means 1309 for sending a misinformation signal indicating the ABS is not almost blank (which may be included, e.g., in transceiver module 860). The apparatus 1300 may also include electrical component means 1310 for forming the at least one additional DL subframe as at least one respective ABS (which may be included, e.g., in controller module 880). The apparatus 1300 may also include electrical component means 1312 detecting at least one UE operable to engage in D2D communications (which may be included, e.g., in signal monitor module 870). The apparatus 1300 may also include electrical component means 1314 for causing formation of an MIB/SIB indicating the added DL is an ABS (which may be included, e.g., in controller module 880). The apparatus 1300 may also include electrical component means 1316 for causing formation of an MIB/SIB indicating the added DL is for D2D communications (which may be included, e.g., in controller module 880).

In related aspects, the processor, memory, and/or the transmitter/receiver of apparatus 1100, 1200, and 1300 may be in operative communication with the components 1101-1111, 1201-1212, and 1301-1316, respectively, via buses 1150, 1250, and 1350, respectively, or via similar communication coupling. The processors may effect initiation and scheduling of the processes and/or functions performed by electrical components 1101-1111, 1201-1212, and 1301-1316.

In other related aspects, transmitter/receiver components of the apparatus described herein may be embodied in a transceiver, and/or a stand alone receiver and/or stand alone transmitter may be used in lieu of or in conjunction with a transceiver. When the apparatus is a base station, eNB, or the like, that apparatus may also include a network interface (not shown) for connecting to one or more core network entities and/or base station entities. Further, either or all of apparatus 1100, 1200, and 1300 may optionally include an additional computer readable component for storing information. That component may be operatively coupled to the other components of the apparatus 1100, 1200, and 1300, such as via the bus 1150, 1250, 1350 or the like. The memory components may be adapted to store computer readable instructions and data for affecting the processes and behavior of the components described in each of the apparatus, and subcomponents thereof, or the processors, or the methods disclosed herein. The memory described herein may store instructions for executing functions associated with the components of the apparatus. It is further noted that the apparatus illustrated in FIGS. 11, 12, 13 may comprise additional processors, electronic devices, hardware devices, electronic sub-components, logical circuits, memories, software codes, firmware codes, etc., or any combination thereof as needed to effect the herein described systems and methods, and/or others not described herein.

Those of skill in the art would understand that information and signals may be represented using any of a variety of different technologies and techniques. For example, data, instructions, commands, information, signals, bits, symbols, and the like that may be referenced herein may be realized using voltages, currents, electromagnetic waves, magnetic fields, electrical particles, optical fields or particles, or any combination thereof.

Those of skill in the relevant arts would further appreciate that the various illustrative logical blocks, modules, circuits, and method steps described in connection with the disclosure herein may be realized using electronic hardware, computer software running on a processor, or combinations of both. To clearly illustrate this interchangeability of such implementations, various illustrative components, blocks, modules, circuits, and steps have been described above generally in terms of their functionality. Whether such functionality is implemented as hardware alone or combined with software depends upon the particular application and design constraints imposed on the overall system. Skilled artisans may implement the described functionality in a variety of ways depending on each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described herein may be embodied directly in hardware, in a software module executed by a processor, or in a combination of the two. A software module may reside in RAM memory, flash memory, ROM memory, EPROM memory, EEPROM memory, registers, magnetic hard disk, a removable disk, a CD-ROM, or any other form of storage medium known in the art. An exemplary storage medium is coupled to the processor such that the processor can read information from, and/or write information to, the storage medium. The storage medium may be distinct from or integral to the processor. The processor and the storage medium may reside in an ASIC. In some cases, the ASIC may reside in a user terminal In the alternative, the processor and the storage medium may reside as discrete components in a user terminal.

In one or more exemplary designs, the functions described may be implemented using hardware, software, firmware, or any combination thereof. If implemented using software, the functions may be stored on or transmitted over as one or more instructions or code on a non-transitory computer-readable medium. Computer-readable media may encompass both computer storage media and communication media including any tangible non-transitory medium that facilitates transfer of a computer program from one place to another. A storage medium may be any available non-transitory medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, can include any optical storage device such as compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The foregoing disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the invention is not intended to be limited to the examples and designs described herein but is to be accorded the widest scope consistent with the principles and novel features disclosed herein, as embodied in the appended claims.

What is claimed is:

1. A communications apparatus, comprising:
a controller module operable to obtain an indicator of a need for a quiescent subframe, and to select responsively thereto a subframe of a communication frame, and to allocate the selected subframe as an Almost Blank Subframe (ABS); and
a transceiver operable to communicate the ABS over an air interface, and to send a misinformation signal to an eNodeB device indicating the ABS is not almost blank.

2. The apparatus of claim 1, wherein the controller module is further operable to form the ABS.

3. The apparatus of claim 1, wherein the need for a quiescent subframe is based on a signal received by the transceiver of which the transceiver is an intended recipient.

4. The apparatus of claim 1, wherein the need for a quiescent subframe is based on a signal monitored by the transceiver of which the transceiver is not an intended recipient.

5. The apparatus of claim 1, wherein the ABS does not contain any user-plane data.

6. The apparatus of claim 1, wherein the misinformation signal is sent via at least one of an X2 and an S1 interface.

7. The apparatus of claim 1, wherein the controller module is further operable to form at least one of a Master Information Block (MIB) and a System Information Block (SIB) indicating that the selected subframe is an ABS.

8. The apparatus of claim 1, wherein the controller module is further operable to form at least one of a Master Information Block (MIB) and a System Information Block (SIB) indicating that the selected subframe is available for Device to Device (D2D) communications.

9. The apparatus of claim 1, wherein the ABS contains at least one of a Common Reference Signal (CRS), a Primary Synchronization Signal (PSS), and a Secondary Synchronization Signal (SSS).

10. A method of accommodating user equipment (UE) device to device (D2D) communications in an LTE wireless communication network, comprising:
an evolved NodeB (eNB) obtaining an indicator of a needed quiescent subframe,
responsive to the indicator, the eNB selecting a subframe of a communication frame;
the eNB allocating the selected subframe for use as an Almost Blank Subframe (ABS);
the eNB transmitting the ABS over an air interface; and
the eNB sending a misinformation signal to a device indicating the ABS is not almost blank.

11. The method of claim 10, further comprising the eNB forming the ABS.

12. The method of claim 10, wherein the need for a quiescent subframe is based on a signal received by a transceiver that is an intended recipient of the signal.

13. The method of claim 10, wherein the need for a quiescent subframe is based on a signal monitored by a transceiver that is not an intended recipient of the signal.

14. The method of claim 10, wherein the ABS does not contain any user-plane data.

15. The method of claim 10, wherein the misinformation signal is sent via at least one of an X2 and an S1 interface.

16. The method of claim 10, further comprising the eNB forming at least one of a Master Information Block (MIB) and a System Information Block (SIB) indicating that the selected subframe is an ABS.

17. The method of claim 10, further comprising the eNB forming at least one of a Master Information Block (MIB) and a System Information Block (SIB) indicating that the selected subframe is available for Device to Device (D2D) communications.

18. The method of claim 10, wherein the ABS contains at least one of a Common Reference Signal (CRS), a Primary Synchronization Signal (PSS), and a Secondary Synchronization Signal (SSS).

19. A non-transitory computer-readable data storage medium that contains code which, when executed on at least one processor associated with a base station in a wireless network, causes the base station to perform a method comprising:
obtaining an indicator of a need for a quiescent subframe,
responsive to the indicator, selecting a subframe of a communication frame;
allocating the selected subframe for use as an Almost Blank Subframe (ABS);
transmitting the ABS over an air interface; and
sending a misinformation signal to an eNodeB device indicating the ABS is not an ABS.

20. The computer-readable medium of claim 19, wherein the method performed comprises forming the ABS.

21. The computer-readable medium of claim 19, wherein the need for a quiescent subframe is based on a signal received by a transceiver that is an intended recipient of the signal.

22. The computer-readable medium of claim 19, wherein the need for a quiescent subframe is based on a signal monitored by a transceiver that is not an intended recipient of the signal.

23. The computer-readable medium of claim 19, wherein the ABS does not contain any user-plane data.

24. The computer-readable medium of claim 19, wherein the misinformation signal is sent via at least one of an X2 and an S1 interface.

25. The computer-readable medium of claim 19, further comprising code for causing the base station to form at least one of a Master Information Block (MIB) and a System Information Block (SIB) indicating that the selected subframe is an ABS.

26. The computer-readable medium of claim 19, further comprising code for causing the base station to form at least one of a Master Information Block (MIB) and a System Information Block (SIB) indicating that the selected subframe is available for Device to Device (D2D) communications.

27. The computer-readable medium of claim 19, wherein the ABS contains at least one of a Common Reference Signal (CRS), a Primary Synchronization Signal (PSS), and a Secondary Synchronization Signal (SSS).

28. A communications apparatus comprising:
   means for obtaining an indicator of a need for a quiescent subframe, and responsive thereto to select a subframe of a communication frame and allocate the selected subframe for use as an Almost Blank Subframe (ABS); and
   means for communicating the ABS over an air interface; and
   means for sending a misinformation signal to an eNodeB device indicating the ABS is not almost blank.

29. The apparatus of claim 28, further comprising means for forming the ABS.

30. The apparatus of claim 28, wherein the need for a quiescent subframe is based on a signal received by the communication means of which the communication means is an intended recipient.

31. The apparatus of claim 28, wherein the need for a quiescent subframe is based on a signal monitored by the communication means of which an communication means is not the intended recipient.

32. The apparatus of claim 28, wherein the ABS does not contain any user-plane data.

33. The apparatus of claim 28, wherein the misinformation signal is sent via at least one of an X2 and an S1 interface.

34. The apparatus of claim 28, further comprising means for forming at least one of a Master Information Block (MIB) and a System Information Block (SIB) indicating that the selected subframe is an ABS.

35. The apparatus of claim 28, further comprising means for forming at least one of a Master Information Block (MIB) and a System Information Block (SIB) indicating that the selected subframe is available for Device to Device (D2D) communications.

36. The apparatus of claim 28, wherein the ABS contains at least one of a Common Reference Signal (CRS), a Primary Synchronization Signal (PSS), and a Secondary Synchronization Signal (SSS).

* * * * *